(12) United States Patent
Cervello et al.

(10) Patent No.: US 7,054,329 B2
(45) Date of Patent: May 30, 2006

(54) COLLISION AVOIDANCE IN IEEE 802.11 CONTENTION FREE PERIOD (CFP) WITH OVERLAPPING BASIC SERVICE SETS (BSSS)

(75) Inventors: Gerard Cervello, Barcelona (ES); Sunghyun Choi, Montvale, NJ (US)

(73) Assignee: Koninklijke Philips Electronics, N.V., Eindhoven (NL)

( * ) Notice: Subject to any disclaimer, the term of this patent is extended or adjusted under 35 U.S.C. 154(b) by 837 days.

(21) Appl. No.: 09/896,716

(22) Filed: Jun. 30, 2001

(65) Prior Publication Data

US 2002/0071448 A1   Jun. 13, 2002

Related U.S. Application Data

(60) Provisional application No. 60/217,146, filed on Jul. 7, 2000.

(51) Int. Cl.
*H04L 12/413* (2006.01)

(52) U.S. Cl. .................. 370/447; 370/461; 370/462

(58) Field of Classification Search ............... 370/319, 370/335–338, 342–343, 346–347, 349, 441–442, 370/445, 447–449, 461–462
See application file for complete search history.

(56) References Cited

U.S. PATENT DOCUMENTS

| | | | | |
|---|---|---|---|---|
| 5,717,688 A | * | 2/1998 | Belanger et al. | 370/331 |
| 5,875,186 A | * | 2/1999 | Belanger et al. | 370/331 |
| 6,693,888 B1 | * | 2/2004 | Cafarelli et al. | 370/338 |
| 6,724,730 B1 | * | 4/2004 | Mlinarsky et al. | 370/241 |
| 6,747,968 B1 | * | 6/2004 | Seppala et al. | 370/338 |
| 6,791,996 B1 | * | 9/2004 | Watanabe et al. | 370/447 |

OTHER PUBLICATIONS

An adaptive multirate IEEE 802.11 wireless LAN Wu, J.-L.C.; Hung-Huan Liu; Yi-Jen Lung; Information Networking, 2001. Proceedings. 15th International Conference on , Jan. 31-Feb. 2, 2001 pp.: 411-418.*

* cited by examiner

*Primary Examiner*—Chi Pham
*Assistant Examiner*—Viet Le

(57) ABSTRACT

A wireless medium access control (MAC) protocol and system for implementing the MAC protocol is arranged to operate in such a manner as to avoid collisions from stations (STAs) comprising two or more IEEE 802.11 basic service sets (BSSs), collocated and operating in the same channel during contention free periods (CFPs). The MAC protocol utilizes ready-to-send (RTS)/clear-to-send(CTS) signals that are exchanged during CFPs to avoid potential collision from STAs in overlapping BSSs.

9 Claims, 6 Drawing Sheets

COLLISION AVOIDANCE IN IEEE 802.11 CONTENTION FREE PERIOD (CFP) WITH OVERLAPPING BASIC SERVICE SETS (BSSS)

This application claims the priority under 35 USC 119(e)(f) of Provisional Application No. 60/217,146 filed Jul. 7, 2000.

BACKGROUND OF THE INVENTION

1. Field of the Invention

The present invention relates to a wireless medium access control (MAC) protocol, and more particularly relates to a hybrid wireless MAC protocol which uses a Ready To Send(RTS)/Clear To Send(CTS) exchange during a contention free period (CFP) in order to avoid contention from Stations (STAs) in overlapping basic service sets (BSSs).

2. Description of Related Art

The wireless communication market has lately enjoyed tremendous growth and is now capable of reaching every place on earth. Hundreds of millions of people exchange information every day using pagers, cellular telephones and other wireless communication products. Wireless communication has broken the harnesses of wireline networks, allowing users to access and share information on a global scale nearly everywhere they venture.

Standard LAN protocols (wireline), such as ETHERNET™, operate on wireline networks using various MAC protocols, e.g., carrier sense multiple access with collision detection (CSMA/CD), at fairly high speeds with inexpensive connection hardware which provides an ability to bring digital networking to practically any computer. Until recently, however, LANs were limited to physical, hard-wired (wireline) infrastructure. Even with phone dial-ups, network nodes were limited to access through wireline connections. Wireline communications, however, have set the stage for wireless communications.

Since the recent development of wireless LANs, many network users, such as mobile users in business, the medical professions, industry, universities, etc., have benefited from the enhanced communication ability of wireless LANs, i.e., increased mobility. Uses for wireless network access are practically unlimited. In addition to increased mobility, wireless LANs offer increased flexibility. Compared to wireline counterparts, however, wireless networks are known to have much less bandwidth, and hence it is highly desirable to utilize the wireless link bandwidth efficiently.

To that end, commonly owned pending application Ser. No. 09/732,585, filed Dec. 8, 2000, and entitled: A Wireless MAC Protocol Based On A Hybrid Combination Of Slot Allocation, Token Passing and Polling For Isochronous Traffic, discloses a mechanism for increasing the efficiency of bandwidth use. The '585 application, incorporated herein by reference, utilizes a hybrid MAC protocol with a combination of bandwidth allocation, a variation on conventional token passing and polling to regulate isochronous traffic efficiently within a wireless network with "hidden" terminals.

The IEEE standard for wireless LAN protocol is identified as "Standard for Information Technology-Telecommunications and information exchange between systems-Local and metropolitan area networks-Specific Requirements-Part 11: Wireless LAN Medium Access Control (MAC) and Physical Layer (PHY)," 1999, which will be referred to hereinafter as IEEE 802.11. IEEE 802.11 specifies parameters of both the physical (PHY) and medium access control (MAC) layers of the network. The PHY network may handle transmission of data between nodes by either direct sequence spread spectrum (DSSS)/complementary code keying (CCK) supporting 1–11 Mbps, frequency-hopping spread spectrum (FHSS) supporting 1 or 2 Mbps, infrared (IR) pulse position modulation supporting 1 or 2 Mbps, or orthogonal frequency division multiplexing (OFDM) modulation supporting 6–54 Mbps.

The MAC layer is a set of protocols which is responsible for maintaining order in the use of a shared medium. IEEE 802.11 specifies a carrier sense multiple access with collision avoidance (CSMA/CA) protocol for use as a random access protocol technique. A CSMA protocol operates as follows. A station (STA) senses the medium, which, if busy, defers transmission of its data packet to a later time. A problem will arise in the case where two (2) STAs sense the medium as being free, for example, contemporaneously, and each transmit a data packet at the same time resulting in a collision. Note that in wireless environment, transmitting and receiving at the same time is almost impossible even with a full duplex radio due to the high signal attenuation. That is, if one senses the medium while it transmits a packet, it will only sense its own packet even if the packet is colliding with another packet in the medium.

Moreover, in such a wireless LAN system, not all STAs can "hear" each other. The 802.11 standard includes collision avoidance (CA) mechanism in order to minimize collisions, which could arise from two STAs, transmitting at the same time.

The conventional mechanism attempts to overcome the problem by implementing the following rules. 1. If a station wishing to transmit a data packet senses that the medium is busy, it defers its transmission. If the station "listens" for a random length of time and finds the medium free, the STA will then transmit. As the reader can guess, this is certainly not a complete solution to the above-stated problem. 2. Alternatively, the receiving station implements a cycle redundancy check (CRC) of the received packet and sends an acknowledgment packet (ACK) to the transmitting station, indicating to the transmitting STA that no collision has occurred. If the transmitting station does not receive the ACK, it retransmits its data packet until it actually receives the ACK, or discards the data. As with rule 1., this is not a complete solution.

Moreover, radio transmissions based on IEEE 802.11 may also be ineffective because transmitting nodes within the wireless LAN cannot hear any other node in the system (network) which may be transmitting. That is, the transmitting node's own signal is presumably stronger than any other signal arriving at the node. The problem can be analogized to the problem of hearing impairment, that is, some nodes are hearing impaired for any of various reasons.

Hidden nodes or stations (STAs) prevent efficient use of bandwidth as a result of their hearing impairment to certain transmissions. For example, FIG. 1 shows a conventional wireless local area network (WLAN) composed of an access point (AP) and a number of stations (STAs). WLAN operation therein is based on the premise that the AP can communicate with all STAs directly over the wireless link while STAs can communicate each other depending on the relative locations due to their limited transmission ranges.

In order to reduce the probability of two STAs transmitting data which will collide because the STAs are not aware of the other's presence (can not "hear" each other) defines a virtual carrier sense (VCS) mechanism. The STA to transmit sends a short control packet referred to as a request to send(RTS) packet. The RTS includes identification of the STA source, its destination, and the duration of its data packet transmission time and time for receipt of the ACK packet. The destination STA responds with a clear to send (CTS) if the medium is free, also including time duration information. All STAs receiving either the RTS or CTS packets set their virtual carrier sense indicators, referred to as network allocation vectors (NAV), for the given time period, and utilize same with their physical carrier sensing mechanism when sensing the medium (see FIG. 2). This reduces the probability of collision.

In prior art FIG. 1, STA 1 is seen as clearly able to communicate by its access point AP1 with STA 2 by its access point AP2, either directly or in one hop, but not with STA 3 and its access point AP3. In FIG. 1, a circle around each STA (and access point A) represents the corresponding transmission range, where STAs 1 and 3 are called hidden terminals to each other since they cannot know even the existence of each other without the help of the access point A in between. Note that the communication between STAs 1 and 3 should be performed via the access point A.

The IEEE 802.11 MAC sub-layer defines two functions for accessing the wireless medium: distributed coordination function (DCF) and point coordination function (PCF), as seen in FIG. 2. The DCF is used to transmit asynchronous data based on Carrier Sense Medium Access with Collision Avoidance (CSMA/CA) mechanism, while the PCF uses a polling mechanism for a "nearly isochronous" service.

The PCF is implemented on top of the DCF, and controlled by a Point Coordinator (PC) which resides inside the access point (AP). An example of the PCF access is shown in FIG. 3. The transmission time is divided into super-frames, where each super-frame is composed of a Contention Free Period (CFP) and a Contention Period (CP). During the CFP, the PCF is used for accessing the medium, while the DCF is used during the CP. The duration of a super-frame is referred to as Contention Free Period Repetition Interval (CFPRI). A CFP starts by a beacon frame sent by the AP or PC. A CFP starts with a beacon frame and finishes with a CF-End frame, both transmitted by the AP (See FIG. 3). The beacon includes the information about the real duration of the CFP to update the network allocation vector (NAV) of the STAs as well as the network synchronization information. A Target Beacon Transmission Time (TBTT) indicates the time when the AP attempts to transmit a beacon, so TBTTs repeat every beacon period. A CFPRI is composed of a number of beacon periods. In some situations, the transmission of the beacon frame can be delayed if a DCF frame from the previous repetition interval carries over into the current interval. This situation is known as stretching, and can be seen in FIG. 2 as 'Delay (due to a busy medium)'. During the CFP, there is no competition for the medium. The AP polls each STA asking for pending frames to be transmitted. In case the STA has any, it will transmit a frame. If the AP receives no response from a polled STA after waiting for a point inter-frame space (PIFS) interval (FIG. 3), it will poll the next STA.

FIG. 4 highlights a situation of overlapping among two BSSs in order to use it for the presentation of our invention. For example, a circle around each STA (and AP) which represents the transmission range of the STA. $STA_{x,1}$ belongs to the BSS of $AP_x$, which is called $BSS_x$. The APs can always reach all the STAs belonging to its BSS, and therefore, all the STAs can always reach its own AP. Unless stated otherwise, the effects of the overlapping STAs will be considered with respect to $STA_{1,1}$ belonging to $BSS_1$. In the overlapping BSS situation of FIG. 4, $AP_1$ can hear $STA_{1,1}$ and $STA_{1,2}$ ($BSS_1$); (2) $STA_{1,1}$ can hear $AP_1$, $STA_{1,2}$, and $STA_{2,1}$; and (3) $STA_{2,1}$ can hear $AP_1$, $STA_{1,1}$, and $STA_{2,1}$. Then, in $BSS_2$, (1) $AP_2$ can hear $STA_{2,1}$; and (2) $STA_{2,1}$ can hear $AP_2$, $STA_{1,1}$, and $STA_{1,2}$. This can happen, for example, in a block of offices, where the BSSs located in two neighboring offices, apartments, etc., interfere to each other.

Here, the main concern is the performance of the CFP under PCF in $BSS_1$ in the existence of the overlapping $BSS_2$. For example, the transmission from $STA_{1,1}$ to $AP_1$ during a CFP can collide with the transmission from $STA_{2,1}$ to $AP_2$. This kind of collision during the CFP can result in severe degradation of the effectiveness of the PCF in terms of the throughput, and it makes really difficult to support QoS using this polling-based PCF.

OBJECTS AND SUMMARY OF THE INVENTION

It is therefore an object of the present invention to provide a wireless MAC protocol, and a wireless LAN system using the MAC protocol which overcomes the shortcomings of the prior art.

It is also an object of the invention to provide a hybrid wireless MAC protocol for isochronous traffic support which uses a novel Ready To Send(RTS)/Clear To Send (CTS) exchange during a contention free period (CFP) in order to avoid contention from Stations (STAs) in overlapping BSSs.

It is yet another object of the present invention to define a new counter called Overlapping Network Allocation Vector (ONAV) to render the RTS/CTS during CFP truly effective even in the existence of the STAs in CFP in the case of overlapping BSSs.

It is still yet another aspect of the invention to provide a hybrid wireless MAC protocol for isochronous traffic support which uses a novel Ready To Send(RTS)/Clear T o Send(CTS) exchange during a contention free period (CFP) in order to avoid contention from Stations (STAs) in overlapping BSSs, combined with a new counter called Overlapping Network Allocation Vector (ONAV) to render the RTS/CTS during CFP truly effective even in the existence of the STAs in CFP in the case of overlapping BSSs. To that end, the present invention sets forth a medium access control (MAC) protocol for avoiding collisions from stations (STAs) comprising two or more IEEE 802.11 basic service sets (BSSs) collocated and operating in the same channel during contention free periods (CFPs). The MAC protocol includes hardware or software for utilizing request-to-send (RTS)/clear-to-send(CTS) exchange during CFPs to avoid potential collision from STAs in overlapping BSSs and hardware or software for providing overlapping network allocation vectors (ONAV) in addition to a network allocation vector (NAV), the ONAV included to facilitate the effectiveness of the hardware or software for utilizing.

A second embodiment of the invention embodies a wireless local area network (WLAN) which utilizes the inventive MAC protocol described above.

A third embodiment of the present invention provides a method for avoiding collisions from stations (STAs) comprising two or more IEEE 802.11 basic service sets (BSSs) collocated and operating in the same channel during contention free periods (CFPs). The MAC protocol includes hardware or software for utilizing request-to-send (RTS)/ clear-to-send(CTS) exchange during CFPs to avoid potential collision from STAs in overlapping BSSs. The method may further include steps for providing an overlapping network allocation vectors (ONAV) in addition to a network allocation vector (NAV), the ONAV included to facilitate the effectiveness of the collision avoidance.

A fourth embodiment of this invention includes a computer programmable device readable by machine, tangibly embodying a program of instructions executable by machine to perform the method steps of the invention set forth herein.

BRIEF DESCRIPTION OF THE DRAWING FIGURES

DETAILED DESCRIPTION OF THE INVENTION

As mentioned herein, one embodiment of the invention comprises means for utilizing an innovative Medium Access Control (MAC) protocol for isochronous traffic support which uses a novel Request To Send(RTS)/Clear To Send (CTS) exchange during a contention free period (CFP) in order to avoid contention from Stations (STAs) in overlapping BSSs, and method for implementing same.

Said first embodiment may further comprise a new counter called Overlapping Network Allocation Vector (ONAV) to render the RTS/CTS during CFP truly effective even in the existence of the STAs in CFP in the case of overlapping BSSs.

A third embodiment of the invention provides a hybrid wireless MAC protocol for isochronous traffic support which uses a novel Ready To Send(RTS)/Clear To Send (CTS) exchange during a contention free period (CFP) in order to avoid contention from Stations (STAs) in overlapping BSSs, combined with a new counter called Overlapping Network Allocation Vector (ONAV) to render the RTS/CTS during CFP truly effective even in the existence of the STAs in CFP in the case of overlapping BSSs.

Figure 1:
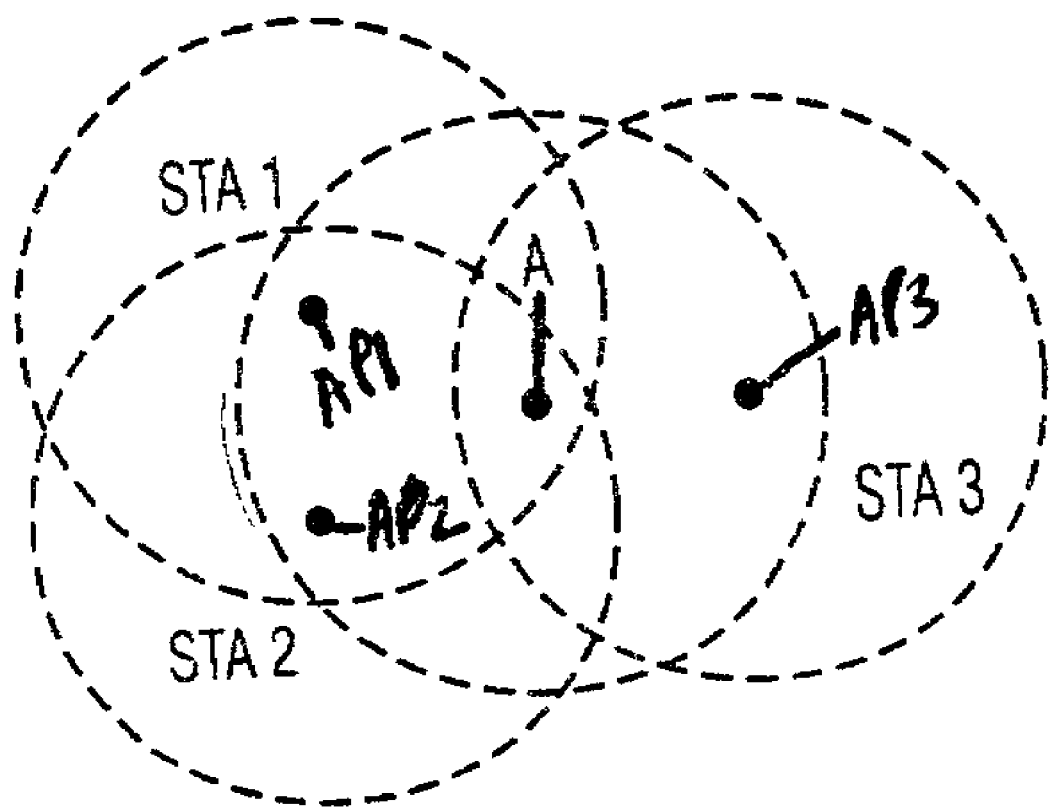
FIG. 1 is a schematic diagram depicting a conventional wireless network comprising stations which may be "hidden" from each other.
Figure 2:
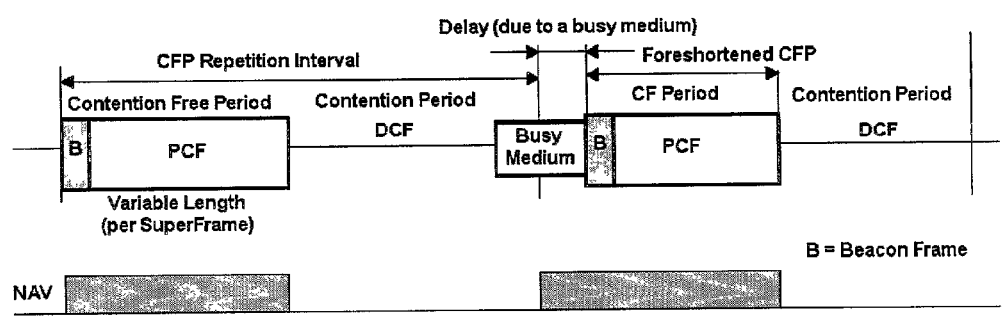
FIG. 2 is a schematic diagram depicting the coexistence of CFP and CP in a super-frame, and an example of stretching and foreshortened CFP.
Figure 3:
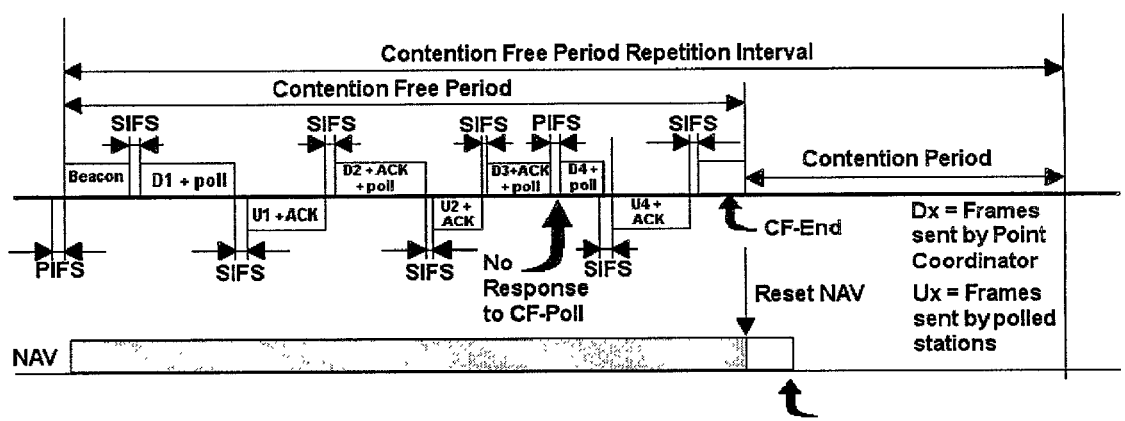
FIG. 3 is a schematic diagram of the PCF working in the CFP in accordance with the present invention.
Figure 4:
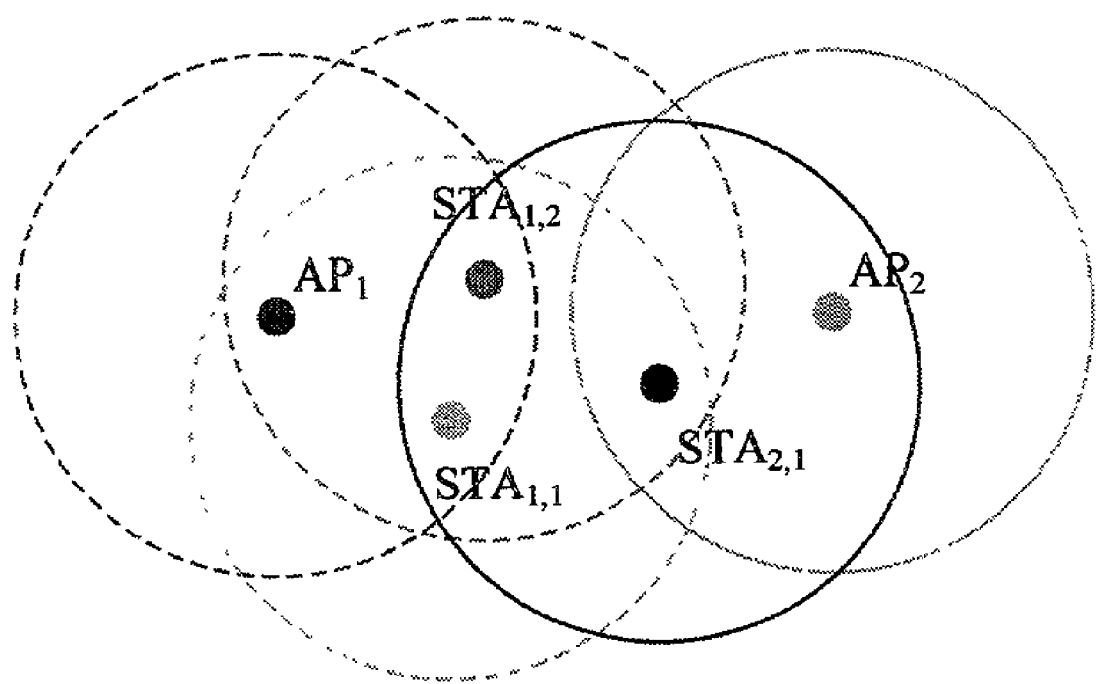
FIG. 4 is a schematic diagram depicting a situation of overlapping BSSs.

More particularly, the inventions disclosed herein utilize a work frame which could included and used in a conventional WLAN such as that shown in FIG. 1. Within the invention, the network frame starts with a beacon transmission from the access point (AP) to all the stations (STA) in the receiving range of the AP (as shown in FIGS. 2 and 3). The beacon includes the information about the time slot allocation for each STA, synchronization information and information about the AP itself, which is necessary for new STAs to associate with the AP.

Figure 5:
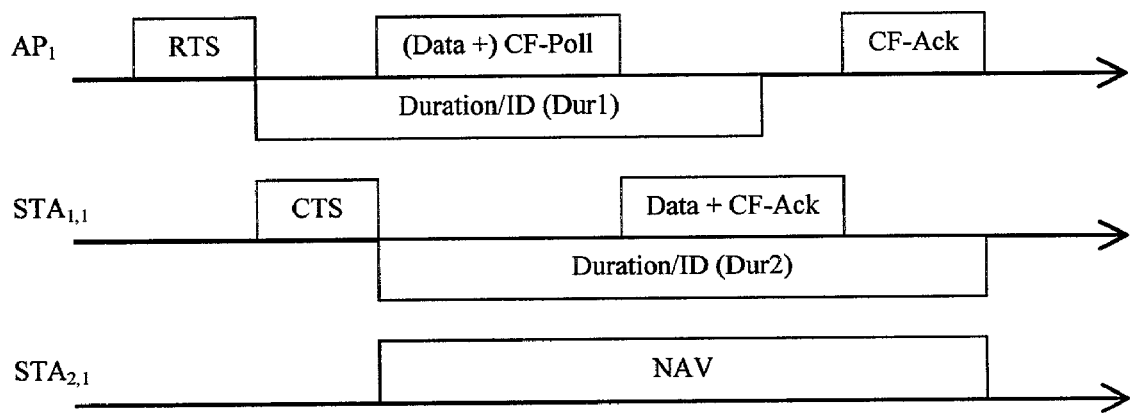
FIG. 5 is a timing diagram of a RTS/CTS exchange during CFP.

FIG. 5 shows the exchange of the RTS/CTS frames during a CFP. Those skilled in the art will realize that we have ignored the short inter-frame space (SIFS) time between two exchanging frames, e.g., between RTS and CTS, for the simplicity of the explanation. The frame formats of RTS/CTS frames transmitted during the CFP are the same as the original frame formats defined in IEEE 802.11 specification.

The only difference is the way to specify/update the Duration/ID field (time) as is set forth in the frame header. For the RTS/CTS during the CFP, the Duration/ID fields are calculated as follows. First, the Duration/ID of the RTS is:

Duration/ID in RTS frame (i.e., Dur1 in FIG. 5)= [duration of CTS]+[duration of (Data+) CF-Poll frame]+[duration of CF-ACK]

The skilled artisan will understand that the $AP_1$ cannot know how long $STA_{1,1}$ will transmit per being polled, i.e., the duration of Data+CF-ACK frame, shown in FIG. 5 is not known to the AP in advance. Now, per receiving the RTS, the STA responds with CTS with the Duration/ID field calculated as follows:

Duration/ID in CTS frame (i.e., Dur2 in FIG. 5)= [Duration/ID specified in the received RTS frame]−[duration of CTS]+[duration of Data+ CF-ACK]

Also shown in FIG. 5, $STA_{2,1}$ sets up the NAV with the Duration/ID value in the received CTS frame, and will not interfere with the transmission between $STA_{2,1}$ to $AP_1$ following the RTS/CTS exchange.

If the RTS/CTS exchange is not successful, for example, assuming $STA_{1,1}$ did not receive the RTS frame correctly, which could occur due to the bad channel condition or an erroneous transmission of $STA_{2,1}$, then $AP_1$ will defer the polling to $STA_{1,1}$ to a future time, and will poll another STA, for example, $STA_{1,2}$ in the situation under consideration. More particularly, if the underlying wireless channel involves bursty errors often, exchanging the RTS/CTS before the polling can minimize the potential failure of the actual data transmission, which can result in the severe throughput degradation. The present inventions address and correct for such situations as a by-product.

The skilled artisan will note that the proposed RTS/CTS may be quite effective when is $STA_{2,1}$ in the CP under DCF. That is, by having a non-zero NAV due to the reception of the CTS from $STA_{1,1}$, in the above example, $STA_{2,1}$ will never initiate a frame transmission. However, if $STA_{2,1}$ in the CFP under PCF, this RTS/CTS exchange will not be effective. This is a result of the fact that $STA_{2,1}$ will set up its NAV at the beginning of the CFP of $BSS_2$, and the reception of the CTS will not update the NAV at all. Moreover, according to the 802.11 PCF mechanism, $STA_{2,1}$ will transmit a frame if it has any data for transmission upon being polled by $AP_2$ irrespective of the value of its NAV. Such transmission by $STA_{2,1}$ may result in a collision with another transmission during the CFP of $STA_{2,1}$'s neighboring BSS. In order to obviate this undesirable situation, the present inventions define and utilize a useful new counter called overlapping network allocation vector (ONAV). Termed differently, the present inventions will maintain ONAV as well as the original NAV for each STA in a system.

There are two rules regarding the ONAV which are implemented by any of the inventions set forth herein. The first ONAV rule requires that the ONAV is updated with the same rule of the original/existing conventional methods for updating a NAV as set forth in IEEE 802.11 MAC with one exception. The exception is that the ONAV is updated by the frames from neighboring BSSs only, not the frames from its own BSS. The second ONAV rule requires that if a STA has a non-zero ONAV, the STA will not respond to the CF-poll from its AP. Accordingly, if a STA being polled does not respond, the AP will assume that (1) the CF-poll was not received correctly, or (2) the STA has non-zero ONAV. The AP will then automatically defer the polling to the future.

The present inventions which include the ONAV as well as the NAV, and the means for implementing ONAV rules 1 and 2, is that the undesirable potential collision discussed above can be eliminated. Moreover, the RTS/CTS exchanges consume the precious wireless bandwidth redundantly if they are used where (1) there is no contention from overlapping BSSs, and (2) the bursty errors are very rare. On the other hand, if the RTS/CTS exchange is not used where it could be useful, the transmitted frames result in a waste of bandwidth due to the unsuccessful transmissions. Therefore, the present invention also defines several decision-making rules (DMR), as is the case with the RTS/CTS in the DCF. The DMR can be implemented by a system control software of the MAC implementation.

The first DMR rule regarding the decision on whether to use RTS/CTS during CFP before a particular (data+)CF-poll frame (that is, whether to use ONAV rules 1 and 2) requires that each STA report to its AP if there are STAs, which belong to other BSSs, within its coverage area. By receiving a frame with a BSSID different from its own, a STA can detect the existence of such STAs easily. For each data transmission to/from such a STA, the AP may initiate the RTS/CTS exchange during CFP.

The second DMR rule regarding the decision on whether to use RTS/CTS during CFP before a particular (data+)CF-poll frame requires that the transmission of the (data+)CF-poll frame which is larger than a predetermined threshold size results in the AP requesting the RTS/CTS exchange during CFP. The second DMR rule is applied to the RTS/CTS decision in the DCF via the parameter RtsThreshold.

The third DMR rule regarding the decision on whether to use RTS/CTS during CFP before a particular (data+)CF-poll frame is based on observing a number of transmission failures to/from a STA which is greater than a predetermined threshold value. In consequence, the present invention requires that the AP may request the RTS/CTS exchange during CFP for the data transmissions involving this STA, effective for time-varying channel with bursty errors.

Figure 6:
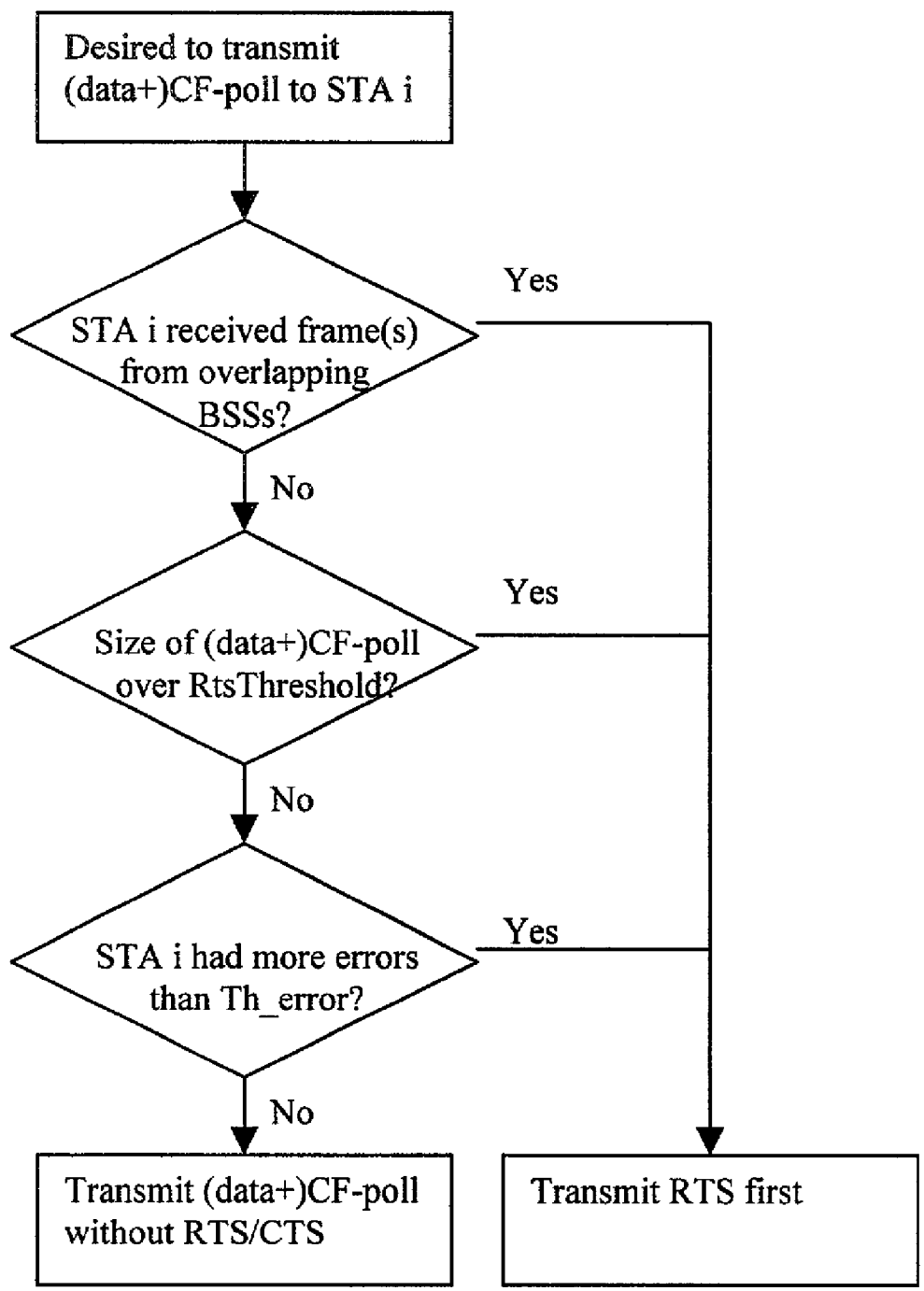
FIG. 6 is a schematic flow diagram depicting an embodiment of a number of steps for implementing a DMR algorithm of this invention.

FIG. 6 shows the diagram for the above-described DMR algorithm.

What is claimed is:

1. A medium access control (MAC) protocol for avoiding collisions from stations (STAs) comprising two or more IEEE 802.11 basic service sets (BSSs) collocated and operating in the same channel during contention free periods (CFPs), comprising:
   a network allocation vector (NAV);
   means for utilizing ready-to-send—(RTS)/clear-to-send (CTS) exchange during CFPs to avoid potential collision from STAs in overlapping BSSs; and
   means for providing overlapping network allocation vectors (ONAV) in addition to the network allocation vector (NAV) for processing by the means for utilizing.

2. The MAC protocol defined by claim 1, further comprising means for updating at duration/ID of both the RTS and CTS frames during the CFP and maintaining that the overlapping STA(s) will not interfere with transmission between an STA and its corresponding AP following the RTS/CTS exchanges.

3. The MAC protocol defined by claim 2, wherein the means for updating the duration/ID of the RTS frame operates by adding: 1) the time length of the CTS; 2) the (duration of the CF data minus the poll frame) and 3) the duration of the CF-ACK, and for updating the duration/ID of the CTS frame by adding the duration/ID specified in the received RTS frame with the (duration of the data and the time length of the CF-ACK) and subtracting the duration time of the CTS from the sum.

4. The MAC protocol defined by claim 2, including means for determining if the RTS/CTS exchange is successful, and, if unsuccessful, deferring polling of the STA by its corresponding AP to a future time, where the AP then polls another STA.

5. The MAC protocol defined by claim 1, further comprising means for determining when to implement the RTS/CTS during CFP.

6. A method for implementing a medium access control (MAC) protocol for avoiding collisions from stations (STAs) comprising two or more IEEE 802.11 basic service sets (BSSs) collocated and operating in the same channel during contention free periods (CFPs), the method comprising the steps:
   providing a network allocation vector (NAV);
   utilizing ready-to-send—(RTS)/clear-to-send(CTS) exchange during CFPs to avoid potential collision from STAs in overlapping BSSs; and
   providing overlapping network allocation vectors (ONAV) in addition to the network allocation vector (NAV) to support the Step of utilizing.

7. A wireless local area network (WLAN) which implements the MAC protocol defined in claim 1.

8. A program storage device readable by a machine, tangibly embodying a program of instructions executable by the machine to perform method steps for which define a medium access control (MAC) protocol for implementing a medium access control (MAC) protocol for avoiding collisions from stations (STAs) comprising two or more IEEE 802.11 basic service sets (BSSs) collocated and operating in the same channel during contention free periods (CFPs), the method comprising the steps:
   providing a network allocation vector (NAV):
   utilizing ready-to-send—(RTS)/clear-to-send(CTS) exchange during CFPs to avoid potential collision from STAs in overlapping BSSs; and
   providing overlapping network allocation vectors (ONAV) in addition to the network allocation vector (NAV), for processing by the means for utilizing.

9. A medium access control (MAC) protocol for avoiding collisions from stations (STAS) comprising two or more IEEE 802.11 basic service sets (BSSs) collocated and operating in the same channel during contention free periods (CFPs), comprising:
   Means for providing a network allocation vector (NAV); and
   Means for providing overlapping network allocation vectors (ONAV) in addition to the network allocation vector (NAV), for processing by the means for utilizing.

* * * * *